United States Patent

Ohara et al.

[11] Patent Number: 6,122,002
[45] Date of Patent: Sep. 19, 2000

[54] DEVICE AND METHOD FOR DETERMINING BLACK POINT

[75] Inventors: Kiyotaka Ohara, Nagoya; Masaaki Hibino, Yokkaichi; Koji Kobayakawa, Ichinomiya; Masashi Ueda, Nagoya; Masaaki Hori, Tajimi; Yasunari Yoshida, Aichi-ken, all of Japan

[73] Assignee: Brother Kogyo Kabushiki Kaisha, Nagoya, Japan

[21] Appl. No.: 08/856,390

[22] Filed: May 14, 1997

[30] Foreign Application Priority Data

May 16, 1996 [JP] Japan ................................. 8-121836

[51] Int. Cl.[7] ........................... H04N 17/00; H04N 5/57; G09G 5/10
[52] U.S. Cl. .......................... 348/191; 348/189; 348/191; 348/687; 348/689; 345/147
[58] Field of Search ..................... 358/447, 515, 358/529, 531, 532; 348/687, 691, 379, 189, 180, 184, 191, 695, 689, 243; 345/147

[56] References Cited

U.S. PATENT DOCUMENTS

| | | |
|---|---|---|
| 4,959,711 | 9/1990 | Hung et al. |
| 5,298,993 | 3/1994 | Edgar et al. ............................ 348/180 |
| 5,381,349 | 1/1995 | Winter et al. ............................ 364/526 |
| 5,483,259 | 1/1996 | Sachs ........................................ 345/153 |
| 5,570,108 | 10/1996 | McLaughline et al. ................. 345/146 |
| 5,754,222 | 5/1998 | Daly et al. ............................... 348/184 |

FOREIGN PATENT DOCUMENTS

| | | |
|---|---|---|
| B2-59-41227 | 10/1984 | Japan . |
| 63-162248 | 7/1988 | Japan . |
| 6-35430 | 2/1994 | Japan . |

*Primary Examiner*—John K. Peng
*Assistant Examiner*—Paulos Natnael
*Attorney, Agent, or Firm*—Oliff & Berridge, PLC

[57] ABSTRACT

The standard brightness region is displayed with input values of zero. The comparison brightness region is displayed with an input value which is variable in the range of 0 to 255. The standard brightness and comparison brightness regions are displayed next to each other in the display. The input value is changed from zero. A first black point is determined as an input value which causes the comparison brightness region to first appear distinguishable from the black regions of the standard brightness regions. Then, the input value is changed from 255. A second black point is determined as an input value which causes the comparison brightness region to first appear indistinguishable from the black regions of the standard brightness regions. Then, a black point is calculated as an average of the first and second black points.

35 Claims, 6 Drawing Sheets

DEVICE AND METHOD FOR DETERMINING BLACK POINT

BACKGROUND OF THE INVENTION

1. Field of the Invention

The present invention relates to a method for determining a black point of a display and a device for determining the black point.

2. Description of Related Art

Display characteristic of a display device depends on a relationship between a value of a signal inputted to the display device and brightness actually obtained on the display device.

The CRT display has a non-linear display characteristic between the value of a signal inputted to the display and brightness actually obtained on the display. More specifically, the display characteristic is as shown in FIG. 1, in which the value of relative brightness changes non-linearly as the value of the input signal varies. The relative brightness is defined as a value of brightness actually attained on the display relative to a maximum brightness which is normalized to a predetermined value of 255. As shown in the figure, the relative brightness decreases as the input value decreases, and reaches zero (0) when the input value reaches a certain value BP which is called as a "black point".

Assuming that each of the input value X and the relative brightness Yd changes among 256 levels 0 to 255, the display characteristic can be approximated by the following exponential function:

$$Yd=0 \text{ when } X<BP$$

$$Yd=\{(X-BP)/(255-BP)\}^{\gamma} \cdot 255 \text{ when } X \geq BP$$

It is noted that the black point BP changes according to a user's control of brightness of the display. The black point BP also changes in time, and according to respective users' visual sensitivities to light. It is therefore necessary to know the black point BP of the display in order to correctly calibrate the display and in order to attain color matching between colors displayed on the display and colors printed by the printer.

In order to determine the black point BP, it is conceivable that the display be controlled to display a test pattern shown in FIG. 2. The test pattern includes a standard brightness region A sandwiched between a pair of identical comparison brightness regions B. The standard brightness region A is formed by an input value X of zero (X=0). The comparison brightness regions B are formed by an input value X which is variable in a range higher than zero (X>0). The user manipulates the device to change the input value X for the regions B until the comparison brightness regions B become lighter than and distinguishable from the region A. In more concrete terms, when the user perceives some slight difference in brightness between the regions A and B, he or she enters this into the device by, for example, pressing a key. The device sets, as the black point BP, the value X which is presently inputted when the input from the user is received.

According to this conceivable method, however, an unskilled user may not determine the black point accurately within a short period of time. It is therefore desirable to provide an improved method for enabling the unskilled user to easily determine the black point.

SUMMARY OF THE INVENTION

It is therefore an object of the present invention to solve the above problems and to provide an improved method and device capable of easily determining the black point accurately within a short period of time and for enabling a user to easily determine the black point.

In order to attain the above and other objects, the present invention provides a method for determining a black point of a display, the method comprising the steps of: controlling a display to display a standard brightness region with an inputted predetermined value which is different from a black point of the display, the standard brightness region exhibiting a predetermined brightness, the standard brightness region serving as a standard for determining a black point; controlling the display to display a comparison brightness region with a variably-inputted value, the comparison brightness region being located next to the first standard brightness region; gradually changing the value inputted for the comparison brightness region so that the comparison brightness region exhibits a brightness change both in a direction from a first state distinguishable from the standard brightness region into a second state indistinguishable from the standard brightness region and in a reverse direction from the second state into the first state; and determining the black point of the display based on the brightness change.

According to another aspect, the present invention provides a device for determining a black point of a display, the device comprising: means for controlling a display to display a standard brightness region with an inputted predetermined value which is different from a black point of the display, the standard brightness region exhibiting a predetermined brightness, the standard brightness region serving as a standard for determining a black point; means for controlling the display to display a comparison brightness region with a variably-inputted value, the comparison brightness region being located next to the first standard brightness region; means for gradually changing the value inputted for the comparison brightness region so that the comparison brightness region exhibits a brightness change both in a direction from a first state distinguishable from the standard brightness region into a second state indistinguishable from the standard brightness region and in a reverse direction from the second state into the first state; and means for determining the black point of the display based on the brightness change.

According to a further aspect, the present invention provides a device for determining a black point of a display, the device comprising: means capable of driving a display to produce a standard brightness region on a display screen based on a predetermined input value, the predetermined input value being lower than the black point, the standard brightness region exhibiting a predetermined brightness corresponding to the predetermined input value, the standard brightness region serving as a standard for determining a black point of the display, the driving means being further capable of driving the display to produce a comparison brightness region on the display screen based on a comparison input value, the comparison brightness region exhibiting a brightness corresponding to the comparison input value and being located next to the standard brightness region; control means for increasing the comparison input value from a value lower than the black point and for decreasing the comparison input value from another predetermined value higher than the black point while controlling the driving means to drive the display to display the standard brightness region and the comparison brightness region; input means for enabling a user to input a black point determination instruction when the comparison brightness region first appears distinguishable from the standard brightness region while the comparison input value is being increased and for enabling a user to input a black point determination instruction also when the comparison brightness region first appears indistinguishable from the standard brightness region while the comparison input value is being decreased; and black point calculation means for calculating a black point of the display based on both a comparison input value inputted when the black point determination instruction is inputted while the comparison input value is being increased and another comparison input value inputted when the black point determination instruction is inputted while the input value is being decreased.

According to still another aspect, the present invention provides a device for determining a black point of a display, the device comprising: standard brightness region generating means for determining a value, to be inputted for a standard brightness region, which is smaller than a black point of a display and for controlling the display to display the standard brightness region with the determined input value, the standard brightness region exhibiting a corresponding brightness, the standard brightness region serving as a standard for determining a black point; comparison brightness region generating means for setting an input value for each pixel in a comparison brightness region so that the input value varies from a first input value higher than the black point to a second input value lower than the black point in a predetermined gradual decreasing tendency so that the input value for the comparative brightness region gradually decreases from the first input value to the second input value in a direction toward the standard brightness region and for controlling the display to display the comparison brightness region with the set input values so that brightness of the comparison brightness region gradually decreases in a direction toward the standard brightness region, the comparison brightness region being located next to the standard brightness region; predetermined condition setting means for setting a predetermined condition to be compared with a parameter of a portion in the comparison brightness region that appears distinguishable from the standard brightness region; input value changing means for changing the input value for each pixel in the comparison brightness region while maintaining the gradual decreasing tendency; black point determination instruction input means for enabling a user to input a black point determination instruction when the parameter of the portion, in the comparison brightness region, that appears distinguishable from the standard brightness region satisfies the predetermined condition; and black point calculation means for calculating a black point of the display based on the input value set for a pixel located on a border line between the condition-satisfying distinguishable portion and a remaining indistinguishable portion when the black point determination instruction is inputted.

According to still another aspect, the present invention provides a device for determining a black point of a display, the device comprising: standard brightness region generating means for determining a value, to be inputted for a standard brightness region, which is higher than a black point of a display and for controlling the display to display the standard brightness region with the determined input value, the standard brightness region exhibiting a corresponding brightness, the standard brightness region serving as a standard for determining a black point; comparison brightness region generating means for setting an input value for each pixel in a comparison brightness region so that the input value varies from a third input value lower than the black point to a fourth input value higher than the black point in a predetermined gradual increasing tendency so that the input value for the comparison brightness region gradually increases from the third input value to the fourth input value in a direction toward the standard brightness region and for controlling the display to display the comparison brightness region with the set input values so that brightness of the comparison brightness region gradually increases in a direction toward the standard brightness region, the comparison brightness region being located next to the standard brightness region; predetermined condition setting means for setting a predetermined condition to be compared with a parameter of a portion in the comparison brightness region that appears distinguishable from the standard brightness region; input value changing means for changing the input value for each pixel in the comparison brightness region while maintaining the gradual increasing tendency; black point determination instruction input means for enabling a user to input a black point determination instruction when the parameter of the portion, in the comparison brightness region, that appears distinguishable from the standard brightness region satisfies the predetermined condition; and black point calculation means for calculating a black point of the display based on the input value set for a pixel located on a border line between the condition-satisfying distinguishable portion and a remaining indistinguishable portion when the black point determination instruction is inputted.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
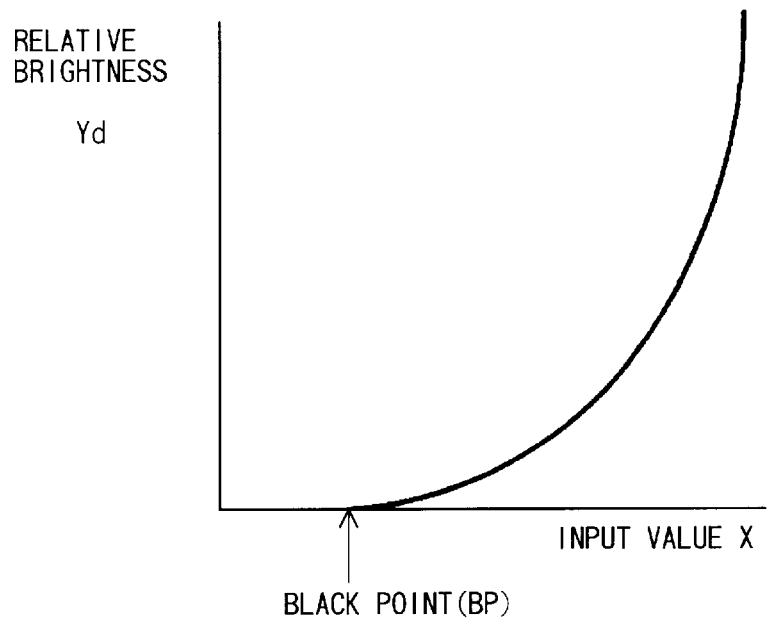
FIG. 1 is a graph indicative of a display characteristic of a CRT display.
Figure 2:
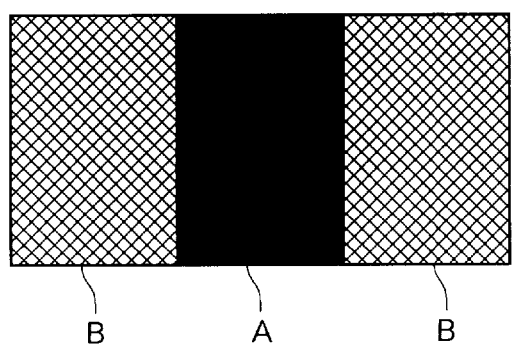
FIG. 2 illustrates how a display is controlled to display a test pattern in a conceivable black point determination process.

A method and device for determining a black point according to preferred embodiments of the present invention will be described while referring to the accompanying drawings wherein like parts and components are designated by the same reference numerals.

Figure 3:
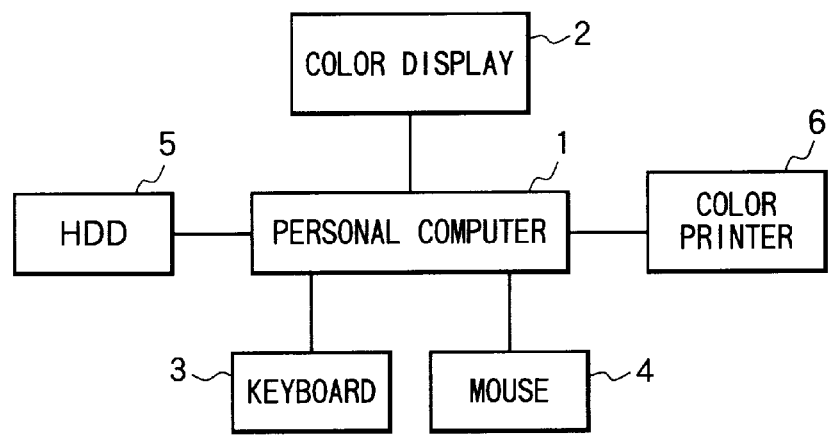
FIG. 3 is a block diagram of a system of a first embodiment of the present invention.

A first embodiment will be described below with reference to FIGS. 3–5. A system according to the first embodiment is constructed from a personal computer 1 and a color display 2 connected to each other. The personal computer 1 is connected to a keyboard 3, a mouse 4, a hard disk 5, and a color printer 6. The personal computer 1 is installed with a black point determination process program whose flowchart is shown in FIG. 5.

Figure 4:
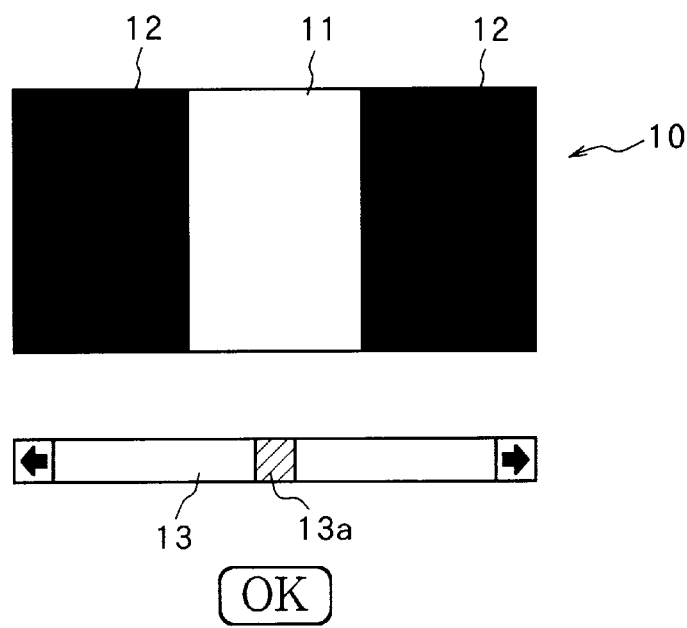
FIG. 4 illustrates how a display of the system of FIG. 3 is controlled to display a test image in a black point determination process of the first embodiment.
Figure 5:
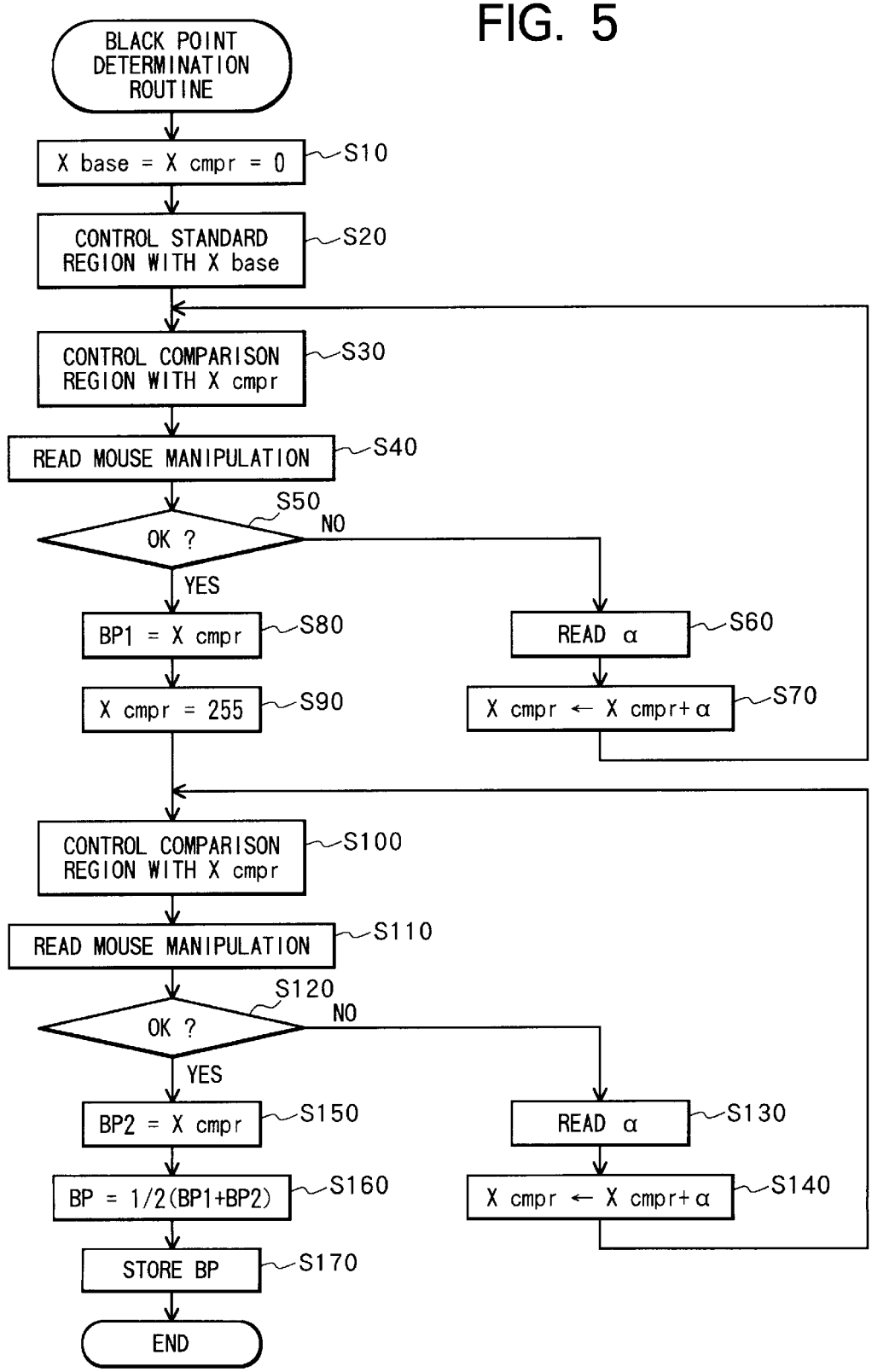
FIG. 5 is a flowchart of the black point determination process according to the first embodiment.

As described later, according to the black point determination process program, the computer 1 controls the display 2 to display a test image 10 as shown in FIG. 4 on its display screen. In the test image 10, a central color patch 11 is sandwiched between a pair of identical color patches 12. A scroll bar 13 is displayed below the test image 10. A slider 13a is provided slidably movable along the scroll bar 13 according to a user's manipulation of the mouse 4. The central color patch 11 will be referred to as a comparison brightness region 11 hereinafter. The color patches 12 will be referred to as standard brightness regions 12 hereinafter. The comparison brightness region 11 is formed by an input value Xcmpr, and the standard brightness regions 12 are formed by another input value Xbase. The input value Xbase is fixed to zero (0). The input value Xcmpr is variable among 256 levels from 0 to 255. Each pixel in the standard brightness regions 12 is controlled to emit light with an input signal (R,G,B) where R=G=B=Xbase. Accordingly, the standard brightness regions 12 exhibit the lowest brightness, i.e., a completely black color.

The black point determination process program will be described below with reference to FIG. 5. That is, when the program is started, an initialization setting is first performed in S10 to set the input values Xbase and Xcmpr both to zero (0). That is, Xbase=Xcmpr=0. Then, each pixel in the standard brightness regions 12 is controlled to emit light with the input RGB signal (R,G,B) where R=G=B=Xbase in S20, and each pixel in the comparison brightness region 11 is controlled to emit light with the input RGB signal (R,G,B) where R=G=B=Xcmpr in S30. Accordingly, the test image 10 initially appears entirely black.

Observing the test image 10 and the scroll bar 13, a user moves the mouse 4 to move the slider 13a, thereby increasing the brightness of the comparison brightness region 11 until the region 11 becomes lighter than and distinguishable from the standard brightness regions 12. That is, the user moves the slider 13a until he or she can perceive some slight difference in brightness between the regions 11 and 12. When the user first notices that the region 11 is slightly brighter than the regions 12, the user clicks the button on the mouse 4 to input a black point determination instruction "OK".

Accordingly, in S40, the computer 1 reads out the user's manipulated state of the mouse 4. The computer 1 judges in S50 whether or not the user manipulates the button on the mouse 4 to instruct his/her instruction "OK". Until receiving the "OK" instruction ("NO" in S50), the program repeatedly performs a detection process of S60 where the computer 1 detects the present position of the slider 13a, and calculates a sliding amount a, with which the slider 13a has moved along the scroll bar 13 from its latest position detected by the latest detection step of S60. It is noted that the sliding amount a is positive when the user has moved the slider 13a in the rightward direction, and the sliding amount a is negative when the user has moved the slider 13a in the leftward direction. Then, in S70, the computer 1 renews the input value Xcmpr through adding the present value Xcmpr with the sliding amount a. Then, the comparison brightness region 11 is controlled based on the renewed value Xcmpr in S30.

When the computer 1 receives the instruction "OK" from the mouse 4 ("yes" in S50), the computer 1 sets in S80 the present value Xcmpr as a first black point BP1. The first black point BP1 is defined as a black point which is detected while the brightness of the comparison brightness region 11 is being increased from the zero value.

Next, in S90, the value Xcmpr is set to 255. That is, Xcmpr 255. Then, in S100, each pixel in the comparison brightness region 11 is controlled to emit light with the input RGB signal (R,G,B) where R=G=B=Xcmpr. As a result, in the test image 10, a completely white color patch 11 appears between completely black color patches 12.

Then, S110 through S120 are performed in a similar manner as in the processes of S40–S50. That is, the user manipulates the mouse 4 to move the slider 13a and decrease the brightness of the comparison brightness region 11 from the value 255. The user then inputs the instruction "OK" when the region 11 first becomes indistinguishable from the black regions 12. That is, the user inputs the instruction "OK" when the user perceives no difference in brightness between the regions 11 and 12. Then, the presently-inputted value Xcmpr is set as a second black point BP2 in S150. The second black point BP2 is thus defined as a black point which is detected while the brightness of the comparison brightness region 11 is being decreased from 255.

Then, an average of the first and second black points BP1 and BP2 is calculated as a black point BP of the display 2 in S160. The thus calculated value BP is stored in the hard disk 5 in S170.

As described above, the computer 1 performs the processes of S20 to generate the standard brightness regions 12. The computer 1 performs the processes of S30 and S100 to generate the comparison brightness region 11. The computer 1 increases and decreases the input value Xcmpr for the comparison brightness region 11 through the processes of S60–S70 and of S130–S140. The user manipulates the mouse 4 to input a black point determination instruction "OK", and the instruction is detected by the computer 1 in S40–S50 and in S110–S120. The computer 1 calculates the black point through the processes of S90, S150, and S160.

As described above, according to the present embodiment, the user detects the first black point BP1 when the comparison brightness region 11 changes from a state indistinguishable from the standard brightness regions 12 into a distinguishable state. That is, the user detects the first black point BP1 when the user first perceives even a slight difference in brightness between the regions 11 and 12. The user further detects the second black point BP2 when the comparison brightness region 11 changes from a state distinguishable from the standard brightness regions 12 into an indistinguishable state. That is, the user detects the second black point BP2 when the user first perceives no difference in brightness between the regions 11 and 12. Thus, the user detects both when the region 11 first appears from the black regions 12 and when the region 11 first disappears into the black regions 12. The user can easily perform this two way observing operation. The black point BP is calculated based on the user's visual observation. Because the black point BP is calculated based on an average of the two black points BP1 and BP2, the black point BP is determined with high accuracy.

As described above, according to the present embodiment, the standard brightness regions 12 are displayed with input values of Xbase of zero (0). The comparison brightness region 11 is displayed with an input value of Xcmpr which is variable in the range of 0 to 255. The regions 12 and 11 are displayed next to each other in the display 2. The input value Xcmpr is changed from zero (0).

A first black point BP1 is determined as an input value Xcmpr which causes the region 11 to first become distinguishable from the black regions 12. Then, the input value Xcmpr is changed from 255. A second black point BP2 is determined as an input value Xcmpr which causes the region 11 to first become indistinguishable from the black regions 12. Then, a black point BP is calculated as an average of the first and second black points BP1 and BP2.

Thus, the first black point is searched while the input value is gradually increased. The second black point is searched while the input value is gradually decreased. An average of the first and second black points may be calculated as a black point. Or, the first and second black points may be weighted before being averaged into a black point. Accordingly, the user can easily search the first and second black points. Because the black point is calculated based on an average of the first and second black points, the obtained black point is of high accuracy. Because the thus determined black point determines the present display characteristic of the display 2, the black point value is used for processing color data to be supplied to the display 2 and color data to be supplied to the printer 6 so as to attain color matching between colors displayed on the display 2 and colors printed by the printer 6. The black point can also be used for calibrating the display 2.

A second embodiment will be described below with reference to FIGS. 6 and 7.

Figure 6:
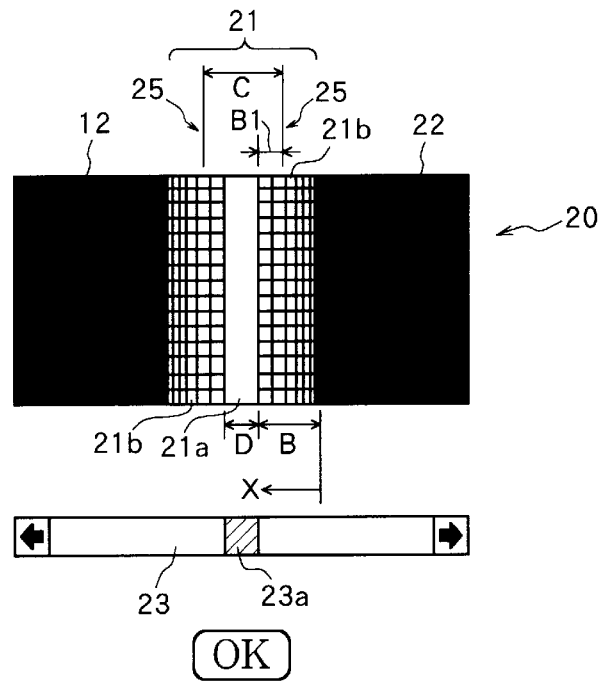
FIG. 6 illustrates how a display of the system of FIG. 3 is controlled to display a test image in a black point determination process of a second embodiment.

According to the present embodiment, the computer 1 controls the display 2 to display a test image 20 as shown in FIG. 6. A scroll bar 23 with a slider 23a is also displayed. In the test image 20, a comparison brightness region 21 is sandwiched between a pair of identical standard brightness regions 22. The comparison brightness region 21 has a central highest brightness area 21a and a pair of side areas 21b sandwiching the central area 21a therebetween. In each side area 21b, brightness gradually decreases from the central area 21a toward the standard brightness region 22.

The input value Xbase for the standard brightness regions 22 is fixed to the value of zero (0) in the same manner as in the first embodiment. An input value Xctr for the central area 21a is variable among the 256 levels from 0 to 255. The input value Xside for each pixel in each side area 21b is expressed by the following formula (2):

$$Xside=(Xctr/B) \cdot x \qquad (2)$$

where B is a width of each side area 21b, and x is a distance between each pixel and the region 22.

Thus, the brightness of each side area 21b gradually and continuously decreases from the central side area 21a to the standard brightness region 22.

Additionally, a pair of marks 25 are displayed above the test image 20 for indicating a predetermined width C therebetween.

The predetermined width C is represented by the following equation:

$$C=D+2B1$$

where D is the width of the central area 21a, and B1 is a predetermined comparative width which will be used for determining the black point as described later.

Figure 7:
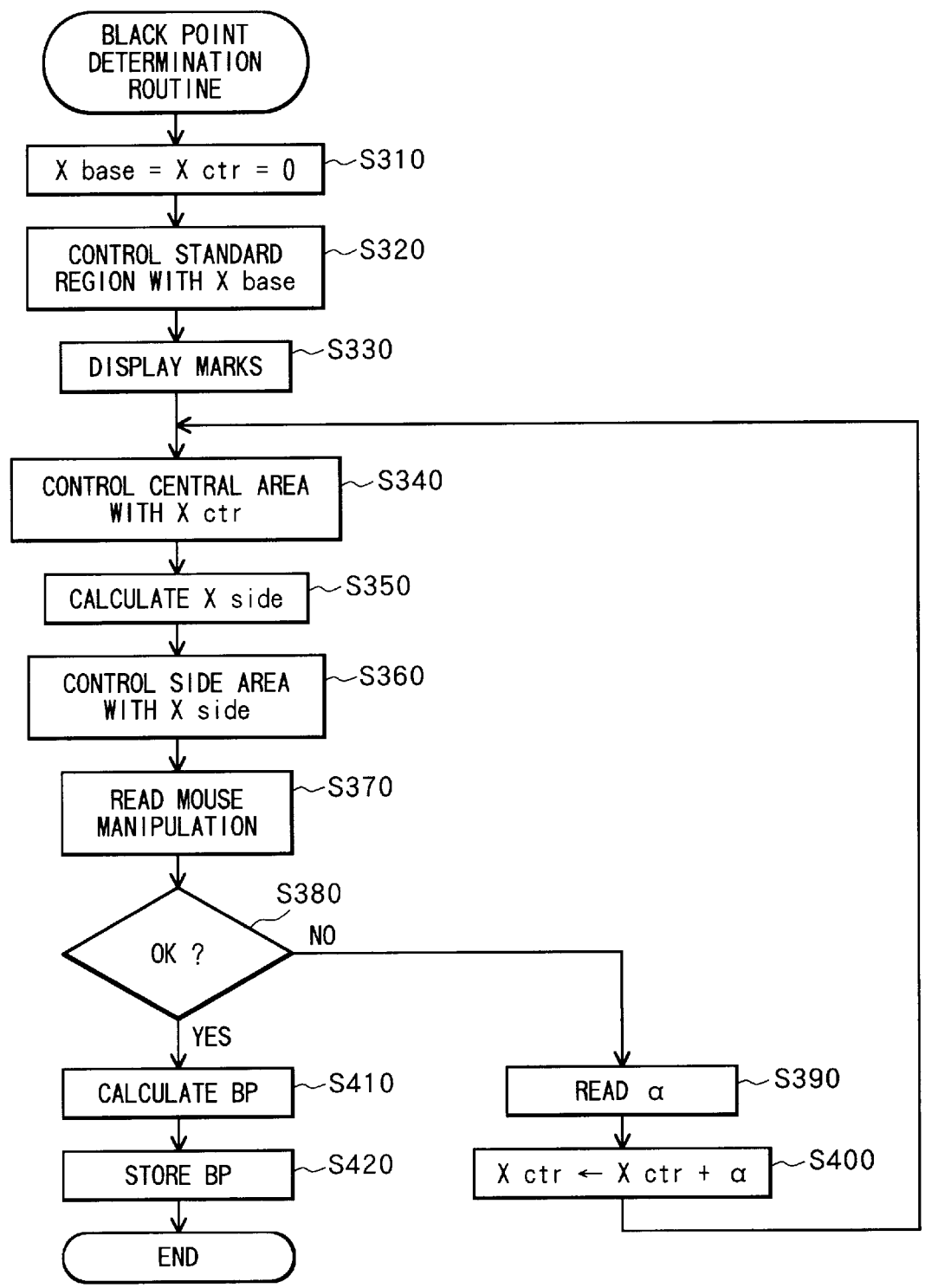
FIG. 7 is a flowchart of the black point determination process according to the second embodiment.

The computer 1 is installed with a black point determination process program shown in FIG. 7.

When the program is started, the initialization setting is first achieved in S310 to set the values Xbase and Xctr both to zero (0). That is, Xbase=Xctr=0. In S320, each pixel in the region 22 is controlled to emit light with an RGB input signal (R,G,B) where R=G=B=Xbase. In S330, the marks 25 are displayed. Then, each pixel in the central area 21a is controlled to emit light with an RGB input signal (R,G,B) where R=G=B=Xctr in S340. Then, in S350, the above-described formula (2) is calculated to obtain a value Xside for each component of an input signal (R,G,B) for each pixel in each side area 21b. Next, in S360, each pixel in each side area 21b is controlled to emit light with the input signal (R,G,B) where R=G=B=Xside. Thus, the test image 20 entirely appears black. The marks 25 are displayed together with the test image 20.

While observing the test image 20 and the marks 25, the user manipulates the mouse 4 to move the slider 23a along the scroll bar 23, thereby increasing the brightness Xctr of the central area 21a. As the brightness of the central area 21a increases, the brightness of the side areas 21b also increases according to the formula (2). As the brightness of the areas 21a and 21b gradually increases, a slightly-bright vertical band becomes appearing in the central part of the comparative brightness region 21. The band is defined as an area whose color is distinguishable from black color of the black regions 22. As the brightness of the central area 21a and the brightness of the side areas 21b increase, the width of this slightly-bright distinguishable band increases. The user moves the slider 23a until the slightly-bright distinguishable band has the width equal to the width C indicated by the marks 25. That is, the user moves the slider 23a until both side edges of the slightly-bright distinguishable band are brought into consistent with the marks 25. When the slightly-bright distinguishable band ranges exactly between the marks 25, the user clicks the button on the mouse 4 to input the instruction "OK".

Accordingly, the computer detects the manipulating condition of the mouse 4 in S370. The computer then judges whether or not the user manipulates the mouse button to input the "OK" instruction in S380. Until receiving the instruction "OK" ("now" in S380), the computer repeatedly performs a detection process of S390 where the computer 1 detects the present position of the slider 23a, and calculates a sliding amount a , with which the slider 23a has moved from the latest position detected at the latest detection process of S390. Similarly to the first embodiment, the sliding amount α is positive when the slider 23a has moved rightwardly and the sliding amount α is negative when the slider 23a has moved leftwardly. The computer 1 then renews in S400 the present input value Xctr through adding the present value Xctr with the sliding amount α. The areas 21a and 21b are then controlled based on the renewed value Xctr in S340–S360.

When receiving the instruction "OK" from the mouse 4 ("yes" in S380), on the other hand, the computer 1 substitutes the present value Xctr for the value Xctr in the following formula (3) to determine a black point BP of the display 2 in S410:

$$BP=(Xctr/B) \cdot (B-B1) \qquad (3)$$

The calculated black point BP is indicative of an input value inputted for pixels located on both side edges of the slightly-bright distinguishable band.

Then, the calculated black point value BP is stored in the hard disk 5 in S420.

Thus, the computer 1 generates the standard brightness region through the process of S320, sets a predetermined comparative condition through the process of S330, generates the comparison brightness region through the processes of S340–S360, and changes the input values for the comparison brightness region through the processes of S390–S400. When the user manipulates the mouse 4 to input the instruction, the computer 1 detects the instruction through the processes of S370 and S380. The computer 1 then calculates the black point through the process of S410.

As described above, according to the second embodiment, the user merely judges whether a width of a band in the region 21 that appears lighter than and distinguishable from the black regions 22 becomes consistent with the predetermined width indicated by the marks 25, and instructs the computer to calculate a black point. The user can perform this judgment very easily.

According to the second embodiment, the brightness of the comparison brightness region gradually decreases toward the standard brightness region and finally disappears into the standard brightness region. Thus, the brightness gradually changes from the portion that appears completely distinguishable from the standard brightness region toward the portion that appears indistinguishable from the standard brightness region. The width of the distinguishable portion in the comparison brightness region varies while the input value for the comparison brightness region is changed. The thus changing width of the distinguishable portion is compared with the predetermined comparative condition. Because the thus distinguishable portion exists, the user can easily specify the border line between the distinguishable portion and the remaining indistinguishable portion. The user can therefore easily judge whether the border line satisfies the comparative condition. Thus, the user can instruct determination of a black point more easily than the conceivable case where the user instructs when a certain color band appears.

A third embodiment will be described below with reference to FIGS. 8 and 9.

Figure 8:
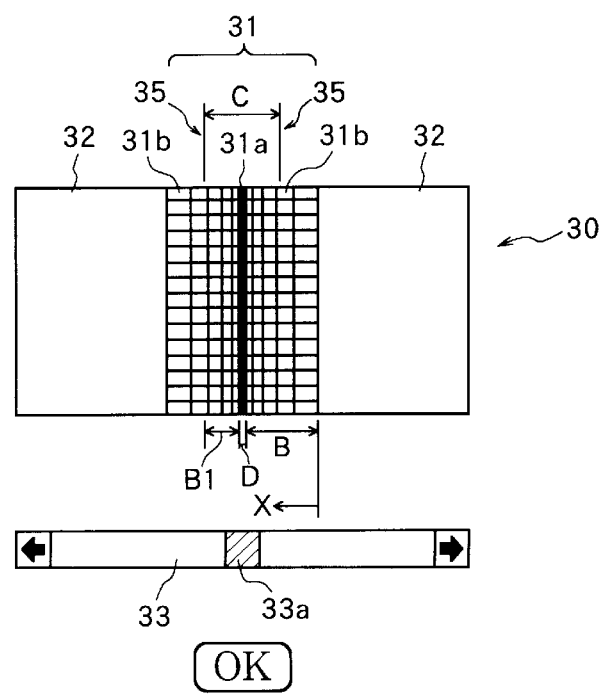
FIG. 8 illustrates how a display of the system of FIG. 3 is controlled to display a test image in a black point determination process of a third embodiment.

According to the present embodiment, the computer 1 controls the display 2 to display another test image 30 and a scroll bar 33 with a slider 33a as shown in FIG. 8. In the test image 30, a comparison brightness region 31 is sandwiched between a pair of identical standard brightness regions 32. The comparison brightness region 31 has a central lowest brightness area 31a and a pair of side areas 31b sandwiching the central area 31a therebetween. In each area 31b, the brightness gradually and continuously increases from the area 31a toward each region 32.

The input value Xbase for the standard brightness regions 32 is fixed to the value of 255 according to the present embodiment. An input value Xctr for the central area 31a is variable among the 256 levels from 0 to 255. The input value Xside for each pixel in each side area 31b is expressed by the following formula (4):

$$Xside = [\{-(255-Xctr)/B\} \cdot x] + 255 \qquad (4)$$

where B is a width of each side area 31b, and x is a distance between each pixel and the region 32.

In the same manner as in the second embodiment, a pair of marks 35 are displayed above the test image 30. The pair of marks 35 have the predetermined width C therebetween. In the same manner as in the second embodiment, the width C and the predetermined comparative width B1 satisfy the following equation:

$$C = 2B1 + D$$

where D is the width of the central area 31a.

Figure 9:
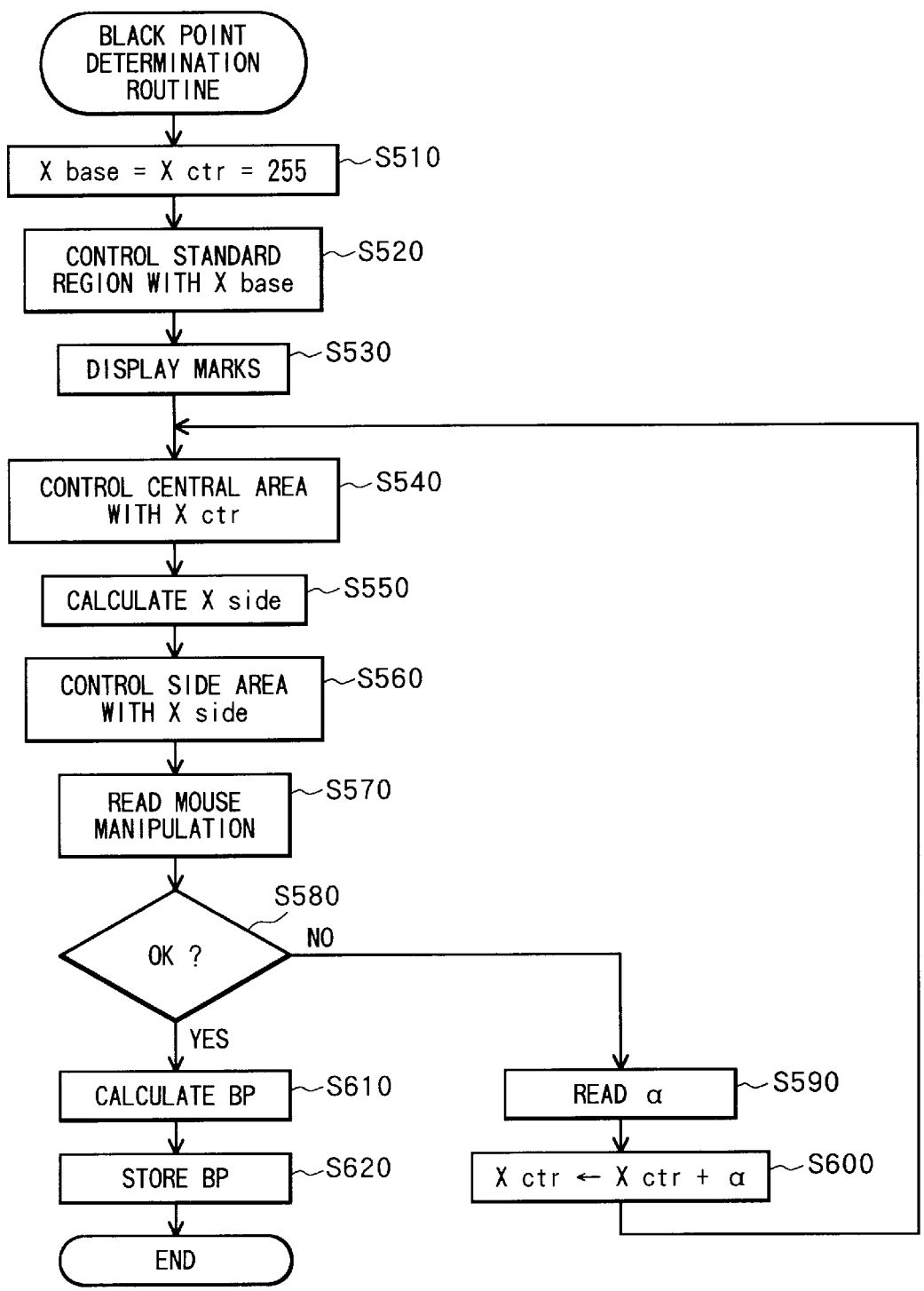
FIG. 9 is a flowchart of the black point determination process according to the third embodiment.

The computer 1 is installed with a black point determination process program shown in FIG. 9.

When the program is started, an initialization setting is first achieved in S510 to set the values Xbase and Xctr both to 255. That is, Xbase=Xctr=255. In S520, each pixel in each region 32 is controlled to emit light with an RGB input signal (R,G,B) where R=G=B=Xbase. In S530, the marks 35 are displayed. Then, each pixel in the central area 31a is controlled to emit light with an RGB input signal (R,G,B) where R=G=B=Xctr in S540. Then, in S550, the above-described formula (4) is calculated to obtain an input signal (R,G,B) where R=G=B=Xside for each pixel in each side area 31b. Next, in S560, each pixel in each side area 31b is controlled to emit light with the input signal (R,G,B) where R=G=B=Xside. Thus, the test image 30 entirely appears white. The marks 35 are displayed together with the test image 30.

While observing the test image 30 and the marks 35, the user manipulates the mouse 4 to move the slider 23a along the scroll bar 23, thereby decreasing the brightness Xctr of the central area 31a and the brightness of the side areas 31b. As the brightness of the central area 31a and the brightness of the side areas 31b decrease, a slightly-dark vertical band becomes appearing in the central part of the comparative brightness region 31. The band is defined as an area whose color is distinguishable from white color of the white regions 32. As the brightness of the central area 31a and the brightness of the side areas 31b decrease, the width of the slightly-bright distinguishable band increases. The user moves the slider 33a until the slightly-dark distinguishable band has the width equal to the width C indicated by the marks 35. That is, the user moves the slider 33a until both side edges of the slightly-dark distinguishable band are brought into consistent with the marks 35. When the slightly-dark distinguishable band ranges exactly between the marks 35, the user clicks the button on the mouse 4 to input the instruction "OK".

Accordingly, the computer 1 detects the manipulating condition of the mouse 4 in S570. Then, the computer judges whether or not the user manipulates the mouse button to input the "OK" instruction in S580. Until receiving the instruction "OK" ("NO" in S580), the computer 1 repeatedly performs detection processes of S590 where the computer detects the present position of the slider 33a and calculates a sliding amount α, with which the slider 33a has moved from the latest position detected at the latest detection process of S590. Similarly to the second embodiment, the sliding amount α is positive when the slider 33a moves rightwardly and the sliding amount α is negative when the slider 33a moves leftwardly. The computer 1 then renews in S600 the present input value Xctr through adding the present value Xctr with the sliding amount α. The areas 31a and 31b are then controlled based on the renewed value Xctr in S540–S560. When detecting the instruction "OK" from the mouse 4 ("YES" in S580), the computer 1 substitutes the present value Xctr for the value Xctr in the following formula (5) to determine a black point BP of the display 2 in S610:

$$BP = [(255-Xctr)B1/B] + Xctr \qquad (5)$$

The calculated black point BP is indicative of an input value inputted for pixels on both side edges of the slightly-dark distinguishable band.

Then, the calculated black point value BP is stored in the hard disk 5 in S620.

Thus, the computer 1 generates the standard brightness regions through the process of S520, sets the predetermined comparative condition through the process of S530, generates the comparison brightness region through the processes of S540–S560, and increases and decreases the input values for the comparison brightness region through the processes of S590–S600. When the user manipulates the mouse 4 to input the instruction, the computer 1 detects the instruction through the processes of S570 and S580. The computer 1 then calculates the black point through the process of S610.

In the present embodiment, the same advantages obtained in the second embodiment are obtained.

In the present embodiment, the input value Xbase for the standard brightness regions 32 is set to 255 for the simplicity and clarity. However, the input value Xbase is desirably set to a value which is higher than the black point BP but which is as close as possible to the black point BP. For example, the input value Xbase may be set to about 20 when the black point is presumed to be in the range of 10 to 15. This is because when the input value Xbase is too high, the comparative width B1 should be set very small and therefore it becomes very difficult for the user to discriminate between the slightly-dark distinguishable portion and the central area 31a. When the input value Xbase is set close to the black point BP, the comparative width B1 can be set to a certain large amount. Accordingly, the width of the distinguishable band will be made quite different from that of the central area 31a.

It is noted that for the same reasons as described above, in the second embodiment, the input value Xbase is desirably set to a value which is lower than the black point BP but which is as close as possible to the black point BP.

While the invention has been described in detail with reference to the specific embodiments thereof, it would be apparent to those skilled in the art that various changes and modifications may be made therein without departing from the spirit of the invention.

For example, in the second and third embodiments, the input value Xside is calculated as linearly changing from the input value Xctr of the central area. However, the input value Xside may be calculated as non-linearly changing from the input value Xctr of the central area. That is, the input value Xside may be determined so as to change through a curved line. In the formulas (2) and (4), the input value Xside is determined dependent on the distance X between each pixel and the standard region. However, the formulas may be determined dependent on a distance (B−X) between each pixel and the central area.

In the first embodiment, the black point BP is calculated merely as an average of the first and second black points BP1 and BP2. However, the first and second black points BP1 and BP2 may be weighted with appropriate weights. The black point BP may be calculated as an average of the thus weighted black points BP1 and BP2.

Alternatively, the difference between the first and second black points BP1 and BP2 may be calculated. When the difference becomes smaller than a specific threshold value, an average of the black points BP1 and BP2 may be calculated as the black point BP. When the difference is larger than the specific threshold value, on the other hand, the processes of FIG. 5 may be performed again. That is, the processes of FIG. 5 may be repeatedly performed until the difference between the black points BP1 and BP2 becomes smaller than the threshold value. Or, a smaller one of the first and second black points BP1 and BP2 may be determined as the black point BP. In any of the above-described modifications for the first embodiment, the brightness of the comparison brightness region is controlled to gradually increase and then controlled to gradually decrease. The black point BP is determined based on the thus performed two-way detection. It is possible to easily determine the black point with high accuracy within a short period of time.

In the above description, the red, green, and blue components of each input value are equal to one another. That is, R=G=B. However, the red, green, and blue components may be different from one another. For example, the red component may be set variable in the range of 0 to 255 while the green and blue components are fixed to zero (0). The black point may be determined for the red component only. The black point for other color components may be determined in the same manner.

In each of the second and third embodiments, the width of the slightly-bright or slightly-dark distinguishable band is compared with the predetermined width C. However, the slightly-bright or slightly-dark distinguishable portion may be formed into any shapes such as a "star" shape other than the above-described band shape, and various parameters, such as a width, an area, or a height, of the slightly-bright or slightly-dark distinguishable portion may be compared with a predetermined value.

According to each of the second and third embodiments, the brightness of the comparison brightness region gradually changes toward the standard brightness region and finally blends into the standard brightness region. Thus, the brightness gradually changes from the portion that appears completely distinguishable from the standard brightness region toward the portion that appears indistinguishable from the standard brightness region. The width, the height, or the area of the distinguishable portion in the comparison brightness region varies while the input value for the comparison brightness region is changed. The thus changing width, height, or area of the distinguishable portion is compared with the predetermined comparative condition. Because the thus distinguishable portion exists, the user can easily specify the border line between the distinguishable portion and the remaining indistinguishable portion. The user can therefore easily judge whether the border line satisfies the comparative condition. Thus, the user can instruct determination of a black point more easily than the conceivable method where the user instructs when a certain color band appears.

What is claimed is:

1. A method for determining a black point of a display, the method comprising the steps of:

controlling a display to display a standard brightness region with an inputted predetermined value which is different from a black point of the display, the standard brightness region exhibiting a predetermined brightness, the standard brightness region serving as a standard for determining a black point;

controlling the display to display a comparison brightness region with a variably-inputted value, the comparison brightness region being located next to the standard brightness region;

gradually changing the value inputted for the comparison brightness region so that the comparison brightness region exhibits a brightness change both in a direction from a first state distinguishable from the standard brightness region into a second state indistinguishable from the standard brightness region and in a reverse direction from the second state into the first state, wherein the value changing step includes the steps of:

gradually increasing the value inputted for the comparison brightness region from a value lower than the black point;

determining, as a first black point, the value inputted when the comparison brightness region first becomes distinguishable from the standard brightness region while the value inputted for the comparison brightness region is being gradually increased;

gradually decreasing the value inputted for the comparison brightness region from a value higher than the black point; and determining, as a second black point, the value inputted when the comparison brightness region first becomes indistinguishable from the standard brightness region while the value inputted for the comparison brightness region is being gradually decreased; and determining the black point of the display based on both the first and second black points.

2. A method as claimed in claim 1, wherein the predetermined value is lower than the black point of the display, and wherein a user is allowed to gradually increase the value inputted for the comparison brightness region from the predetermined value until the comparison brightness region first becomes distinguishable from the standard brightness region, and wherein the user is allowed to gradually decrease the value inputted for the comparison brightness region from another predetermined value higher than the black point until the comparison brightness region first becomes indistinguishable from the standard brightness region.

3. A method as claimed in claim 2, wherein the user is allowed to input a first black point determination instruction when the user visually confirms that the comparison brightness region first becomes distinguishable from the standard brightness region while the value inputted for the comparison brightness region is being gradually increased, the first black point being determined in response to the first black point determination instruction, and wherein the user is allowed to input a second black point determination instruction when the user visually confirms that the comparison brightness region first becomes indistinguishable from the standard brightness region while the value inputted for the comparison brightness region is being gradually decreased, the second black point being determined in response to the second black point determination instruction.

4. A method as claimed in claim 3, wherein the predetermined value is equal to a possible minimum value inputtable to the display, and the other predetermined value is equal to a possible maximum value inputtable to the display, and wherein the user is allowed to gradually change the value inputted for the comparison brightness region from the predetermined value until inputting the first black point determination instruction, and wherein the user is allowed to gradually change the value inputted for the comparison brightness region from the other predetermined value until inputting the second black point determination instruction.

5. A method as claimed in claim 1, wherein the black point of the display is calculated to have a value equal to an average of the first and second black points.

6. A method for determining a black point of a display, the method comprising the steps of:

controlling a display to display a standard brightness region with an inputted predetermined value which is different from a black point of the display, the standard brightness region exhibiting a predetermined brightness, the standard brightness region serving as a standard for determining a black point, the predetermined value being lower than the black point of the display;

controlling the display to display a comparison brightness region with a variably-inputted value, the comparison brightness region being located next to the standard brightness region, wherein the comparison brightness region display controlling step includes the steps of:

setting an input value for each pixel in the comparison brightness region so that the input value gradually decreases from a first input value which is higher than the black point to the predetermined value in a direction toward the standard brightness region; and controlling the display to display the comparison brightness region with the set input value so that brightness of the comparison brightness region gradually decreases in a direction toward the standard brightness region so as to define therein a portion appearing distinguishable from the standard brightness region and a remaining portion appearing indistinguishable from the standard brightness region;

gradually changing the value inputted for the comparison brightness region, the input value changing step including the step of changing the input value for each pixel in the comparison brightness region while maintaining the gradual decreasing tendency until a parameter indicative of the distinguishable portion satisfies a predetermined condition; and determining the black point of the display based on the condition-satisfying input value for a pixel that is located on the border line between the distinguishable portion and the indistinguishable portion.

7. A method as claimed in claim 6, wherein the parameter indicative of the distinguishable portion includes either one of a width, a height, and an area of the distinguishable portion.

8. A method as claimed in claim 6, wherein the parameter indicative of the distinguishable portion includes a width of the distinguishable portion.

9. A method as claimed in claim 6, wherein the gradual decreasing tendency is defined as a predetermined function based on an input value for a highest brightness pixel in the comparison brightness region and based on a distance between each pixel and the highest brightness exhibiting pixel, wherein the input value changing step changes the input value for the highest brightness exhibiting pixel, thereby allowing the parameter of the distinguishable portion to vary, and wherein the input value for the pixel on the border is determined dependently on the input value for the highest brightness exhibiting pixel, the predetermined condition, and the predetermined function.

10. A method for determining a black point of a display, the method comprising the steps of:

controlling a display to display a standard brightness region with an inputted predetermined value which is different from a black point of the display, the standard brightness region exhibiting a predetermined brightness, the standard brightness region serving as a standard for determining a black point, the predetermined value being higher than the black point of the display;

controlling the display to display a comparison brightness region with a variably-inputted value, the comparison brightness region being located next to the standard brightness region, wherein the comparison brightness region display controlling step includes the steps of:

setting an input value for each pixel in the comparison brightness region so that the input value gradually increases from a first input value which is lower than the black point to the predetermined value in a direction toward the standard brightness region; and controlling the display to display the comparison brightness region with the set input value so that brightness of the comparison brightness region gradually increases in a direction toward the standard brightness region so as to define therein a portion appearing distinguishable from the standard brightness region and a remaining portion appearing indistinguishable from the standard brightness region;

gradually changing the value inputted for the comparison brightness region, the input value changing step including the step of changing the input value for each pixel in the comparison brightness region while maintaining the gradual increasing tendency until a parameter indicative of the distinguishable portion satisfies a predetermined condition; and determining the black point of the display based on the condition-satisfying input value for a pixel that is located on the border line between the distinguishable portion and the indistinguishable portion.

11. A method as claimed in claim 10, wherein the parameter indicative of the distinguishable portion includes either one of a width, a height, and an area of the distinguishable portion.

12. A method as claimed in claim 10, wherein the parameter indicative of the distinguishable portion includes a width of the distinguishable portion.

13. A method as claimed in claim 10, wherein the gradual increasing tendency is defined as a predetermined function based on an input value for a lowest brightness pixel in the comparison brightness region and based on a distance between each pixel and the lowest brightness exhibiting pixel, wherein the input value changing step changes the input value for the lowest brightness exhibiting pixel, thereby allowing the parameter of the distinguishable portion to vary, and wherein the input value for the pixel on the border is determined dependently on the input value for the lowest brightness exhibiting pixel, the predetermined condition, and the predetermined function.

14. A device for determining a black point of a display, the device comprising:

means for controlling a display to display a standard brightness region with an inputted predetermined value which is different from a black point of the display, the standard brightness region exhibiting a predetermined brightness, the standard brightness region serving as a standard for determining a black point;

means for controlling the display to display a comparison brightness region with a variably-inputted value, the comparison brightness region being located next to the standard brightness region;

means for gradually changing the value inputted for the comparison brightness region so that the comparison brightness region exhibits a brightness change both in a direction from a first state distinguishable from the standard brightness region into a second state indistinguishable from the standard brightness region and in a reverse direction from the second state into the first state, wherein the value changing means includes:

means for gradually increasing the value inputted for the comparison brightness region from a value lower than the black point;

means for determining, as a first black point, the value inputted when the comparison brightness region first becomes distinguishable from the standard brightness region while the value inputted for the comparison brightness region is being gradually increased;

means for gradually decreasing the value inputted for the comparison brightness region from a value higher than the black point; and means for determining, as a second black point, the value inputted when the comparison brightness region first becomes indistinguishable from the standard brightness region while the value inputted for the comparison brightness region is being gradually decreased; and means for determining the black point of the display based on both the first and second black points.

15. A device as claimed in claim 14, wherein the predetermined value is lower than the black point of the display, and further comprising input means for enabling a user to gradually increase the value inputted for the comparison brightness region from the predetermined value until the comparison brightness region first becomes distinguishable from the standard brightness region, and wherein the input means further enables the user to gradually decrease the value inputted for the comparison brightness region from another predetermined value higher than the black point until the comparison brightness region first becomes indistinguishable from the standard brightness region.

16. A device as claimed in claim 15, wherein the input means further enables the user to input a first black point determination instruction when the user visually confirms that the comparison brightness region first becomes distinguishable from the standard brightness region while the value inputted for the comparison brightness region is being gradually increased, the first black point determining means determining the first black point in response to the first black point determination instruction, the input means further enables the user to input a second black point determination instruction when the user visually confirms that the comparison brightness region first becomes indistinguishable from the standard brightness region while the value inputted for the comparison brightness region is being gradually decreased, the second black point determination means determining the second black point in response to the second black point determination instruction.

17. A device as claimed in claim 16, wherein the predetermined value is equal to a possible minimum value inputtable to the display, and the other predetermined value is equal to a possible maximum value inputtable to the display, and wherein the input means enables the user to gradually change the value inputted for the comparison brightness region from the predetermined value until inputting the first black point determination instruction, and wherein the input means allows the user to gradually change the value inputted for the comparison brightness region from the other predetermined value until inputting the second black point determination instruction.

18. A device as claimed in claim 14, wherein the black point of the display is calculated to have a value equal to an average of the first and second black points.

19. A device for determining a black point of a display, the device comprising:

means for controlling a display to display a standard brightness region with an inputted predetermined value which is different from a black point of the display, the standard brightness region exhibiting a predetermined brightness, the standard brightness region serving as a standard for determining a black point;

means for controlling the display to display a comparison brightness region with a variably-inputted value, the comparison brightness region being located next to the standard brightness region, wherein the comparison brightness region display controlling means includes:

means for setting an input value for each pixel in the comparison brightness region so that the input value gradually decreases from a first input value which is higher than the black point to the predetermined value in a direction toward the standard brightness region; and means for controlling the display to display the comparison brightness region with the set input value so that brightness of the comparison brightness region gradually decreases in a direction toward the standard brightness region so as to define therein a portion appearing distinguishable from the standard brightness region and a remaining portion appearing indistinguishable from the standard brightness region;

means for gradually changing the value inputted for the comparison brightness region, the input value changing means including means for changing the input value for each pixel in the comparison brightness region while maintaining the gradual decreasing tendency until a parameter indicative of the distinguishable portion satisfies a predetermined condition; and means for determining the black point of the display based on the condition-satisfying input value for a pixel that is located on the border line between the distinguishable portion and the indistinguishable portion.

20. A device as claimed in claim 19, wherein the parameter indicative of the distinguishable portion includes either one of a width, a height, and an area of the distinguishable portion.

21. A device as claimed in claim 19, wherein the parameter indicative of the distinguishable portion includes a width of the distinguishable portion.

22. A device as claimed in claim 19, wherein the gradual decreasing tendency is defined as a predetermined function based on an input value for a highest brightness pixel in the comparison brightness region and based on a distance between each pixel and the highest brightness exhibiting pixel, wherein the input value changing means changes the input value for the highest brightness exhibiting pixel, thereby allowing the parameter of the distinguishable portion to vary, and wherein the input value for the pixel on the border is determined dependently on the input value for the highest brightness exhibiting pixel, the predetermined condition, and the predetermined function.

23. A device for determining a black point of a display, the device comprising:

means for controlling a display to display a standard brightness region with an inputted predetermined value which is different from a black point of the display, the standard brightness region exhibiting a predetermined brightness, the standard brightness region serving as a standard for determining a black point, the predetermined value being higher than the black point of the display;

means for controlling the display to display a comparison brightness region with a variably-inputted value, the comparison brightness region being located next to the standard brightness region, wherein the comparison brightness region display controlling means includes:

means for setting an input value for each pixel in the comparison brightness region so that the input value gradually increases from a first input value which is lower than the black point to the predetermined value in a direction toward the standard brightness region; and means for controlling the display to display the comparison brightness region with the set input value so that brightness of the comparison brightness region gradually increases in a direction toward the standard brightness region so as to define therein a portion appearing distinguishable from the standard brightness region and a remaining portion appearing indistinguishable form the standard brightness region;

means for gradually changing the value inputted for the comparison brightness region, the input value changing means including means for changing the input value for each pixel in the comparison brightness region while maintaining the gradual increasing tendency until a parameter indicative of the distinguishable portion satisfies a predetermined condition; and means for determining the black point of the display based on the condition-satisfying input value for a pixel that is located on the border line between the distinguishable portion and the indistinguishable portion.

24. A device as claimed in claim 23, wherein the parameter indicative of the distinguishable portion includes either one of a width, a height, and an area of the distinguishable portion.

25. A device as claimed in claim 23, wherein the parameter indicative of the distinguishable portion includes a width of the distinguishable portion.

26. A device as claimed in claim 23, wherein the gradual increasing tendency is defined as a predetermined function based on an input value for a lowest brightness pixel in the comparison brightness region and based on a distance between each pixel and the lowest brightness exhibiting pixel, wherein the input value changing means changes the input value for the lowest brightness exhibiting pixel, thereby allowing the parameter of the distinguishable portion to vary, and wherein the input value for the pixel on the border is determined dependently on the input value for the lowest brightness exhibiting pixel, the predetermined condition, and the predetermined function.

27. A device for determining a black point of a display, the device comprising:

means capable of driving a display to produce a standard brightness region on a display screen based on a predetermined input value, the predetermined input value being lower than the black point, the standard brightness region exhibiting a predetermined brightness corresponding to the predetermined input value, the standard brightness region serving as a standard for determining a black point of the display, the driving means being further capable of driving the display to produce a comparison brightness region on the display screen based on a comparison input value, the comparison brightness region exhibiting a brightness corresponding to the comparison input value and being located next to the standard brightness region;

control means for increasing the comparison input value from a value lower than the black point and for decreasing the comparison input value from another predetermined value higher than the black point while controlling the driving means to drive the display to display the standard brightness region and the comparison brightness region;

input means for enabling a user to input a black point determination instruction when the comparison brightness region first appears distinguishable from the standard brightness region while the comparison input value is being increased and for enabling a user to input a black point determination instruction also when the comparison brightness region first appears indistinguishable from the standard brightness region while the comparison input value is being decreased; and black point calculation means for calculating a black point of the display based on both a comparison input value inputted when the black point determination instruction is inputted while the comparison input value is being increased and another comparison input value inputted when the black point determination instruction is inputted while the input value is being decreased.

28. A device for determining a black point of a display, the device comprising:

standard brightness region generating means for determining a value, to be inputted for a standard brightness region, which is smaller than a black point of a display and for controlling the display to display the standard brightness region with the determined input value, the standard brightness region exhibiting a corresponding brightness, the standard brightness region serving as a standard for determining a black point;

comparison brightness region generating means for setting an input value for each pixel in a comparison brightness region so that the input value varies from a first input value higher than the black point to a second input value lower than the black point in a predetermined gradual decreasing tendency so that the input value for the comparative brightness region gradually decreases from the first input value to the second input value in a direction toward the standard brightness region and for controlling the display to display the comparison brightness region with the set input values so that brightness of the comparison brightness region gradually decreases in a direction toward the standard brightness region, the comparison brightness region being located next to the standard brightness region;

predetermined condition setting means for setting a predetermined condition to be compared with a parameter of a portion in the comparison brightness region that appears distinguishable from the standard brightness region;

input value changing means for changing the input value for each pixel in the comparison brightness region while maintaining the gradual decreasing tendency;

black point determination instruction input means for enabling a user to input a black point determination instruction when the parameter of the portion, in the comparison brightness region, that appears distinguishable from the standard brightness region satisfies the predetermined condition; and black point calculation means for calculating a black point of the display based on the input value set for a pixel located on a border line between the condition-satisfying distinguishable portion and a remaining indistinguishable portion when the black point determination instruction is inputted.

29. A device of claim 28, wherein the comparison brightness region generating means sets the gradual decreasing tendency as a predetermined function based on an input value for a highest brightness pixel in the comparison brightness region and based on a distance between each pixel and the highest brightness exhibiting pixel, wherein the parameter of the distinguishable portion varies as the input value changing means changes the input value for the highest brightness pixel, and wherein the black point calculation means determines the input value for the pixel on the border dependently on the input value for the highest brightness exhibiting pixel, the predetermined condition, and the predetermined function.

30. A device as claimed in claim 29, wherein the input value changing means allows the user to change an input value for the highest brightness exhibiting pixel until the user inputs the black point determination instruction.

31. A device as claimed in claim 29, wherein the predetermined function is defined to gradually decrease the input value for the comparison brightness region from the highest brightness pixel which is located most distant from the standard brightness region toward a lowest brightness exhibiting pixel which is located next to the standard brightness region, the predetermined function continuously connects the brightness of the lowest brightness exhibiting pixel to the brightness of the standard brightness region.

32. A device for determining a black point of a displays the device comprising:

standard brightness region generating means for determining a value, to be inputted for a standard brightness region, which is higher than a black point of a display and for controlling the display to display the standard brightness region with the determined input value, the standard brightness region exhibiting a corresponding brightness, the standard brightness region serving as a standard for determining a black point;

comparison brightness region generating means for setting an input value for each pixel in a comparison brightness region so that the input value varies from a third input value lower than the black point to a fourth input value higher than the black point in a predetermined gradual increasing tendency so that the input value for the comparison brightness region gradually increases from the third input value to the fourth input value in a direction toward the standard brightness region and for controlling the display to display the comparison brightness region with the set input values so that brightness of the comparison brightness region gradually increases in a direction toward the standard brightness region, the comparison brightness region being located next to the standard brightness region;

predetermined condition setting means for setting a predetermined condition to be compared with a parameter of a portion in the comparison brightness region that appears distinguishable from the standard brightness region;

input value changing means for changing the input value for each pixel in the comparison brightness region while maintaining the gradual increasing tendency;

black point determination instruction input means for enabling a user to input a black point determination instruction when the parameter of the portion, in the comparison brightness region, that appears distinguishable from the standard brightness region satisfies the predetermined condition; and black point calculation means for calculating a black point of the display based on the input value set for a pixel located on a border line between the condition-satisfying distinguishable portion and a remaining indistinguishable portion when the black point determination instruction is inputted.

33. A device of claim 32, wherein the comparison brightness region generating means sets the gradual increasing tendency as a predetermined function based on an input value for a lowest brightness pixel in the comparison brightness region and based on a distance between each pixel and the lowest brightness exhibiting pixel, wherein the parameter of the distinguishable portion varies as the input value changing means changes the input value for the lowest brightness pixel, and wherein the black point calculation means determines the input value for the pixel on the border dependently on the input value for the lowest brightness exhibiting pixel, the predetermined condition, and the predetermined function.

34. A device as claimed in claim 33, wherein the input value changing means allows the user to change an input value for the lowest brightness exhibiting pixel until the user inputs the black point determination instruction.

35. A device as claimed in claim 33, wherein the predetermined function is defined to gradually increase the input value for the comparison brightness region from the lowest brightness pixel which is located most distant from the standard brightness region toward a highest brightness exhibiting pixel which is located next to the standard brightness region, the predetermined function continuously connects the brightness of the highest brightness exhibiting pixel to the brightness of the standard brightness region.

* * * * *